United States Patent [19]
Dull et al.

[11] Patent Number: 5,714,192
[45] Date of Patent: Feb. 3, 1998

[54] METHOD FOR REMOVAL OF CAPSAICINOIDS FROM PEPPERS

[75] Inventors: Bob J. Dull, O'Fallon, Ill.; David J. Domingues, Plymouth; Thomas E. Heinzen, Burnsville, both of Minn.

[73] Assignee: The Pillsbury Company, Minneapolis, Minn.

[21] Appl. No.: 631,831

[22] Filed: Apr. 10, 1996

Related U.S. Application Data

[63] Continuation-in-part of Ser. No. 421,395, Apr. 13, 1995, Pat. No. 5,676,991.

[51] Int. Cl.$^6$ ........................................ A23L 1/211
[52] U.S. Cl. .................. 126/534; 426/425; 426/430; 426/431; 426/478; 426/650
[58] Field of Search .................... 426/534, 650, 426/425, 431, 430, 478

[56] References Cited

FOREIGN PATENT DOCUMENTS 61-242559  10/1986  Japan .

OTHER PUBLICATIONS

Elisabeth Ortiz, "The Encyclopedia of Herbs, Spices & Flavorings", p. 67, 1992.
Pillsbury Literature Search entitled: Aqueous Extraction of Capsaicin; dated Mar. 1, 1996.

*Primary Examiner*—Lien Tran
*Attorney, Agent, or Firm*—Haverstock, Garrett & Roberts

[57] ABSTRACT

A method is described for removing capsaicinoids from a pepper whereby the pepper's placental membrane is exposed to an aqueous solution. Preferably, the pepper or peppers will be cut in sizes ranging from minced to longitudinal cuts to expose and rupture the placental membrane, allowing an aqueous solution to contact, physically wash, and solubilize the capsaicinoids. In the preferred embodiment, the peppers are minced and placed in a heated aqueous solution. The aqueous solution pepper mixture is then agitated at a mixing speed tip velocity of between about 30 feet/minute and about 270 feet/minute. The peppers are then removed from the aqueous solution and rinsed to remove excess aqueous solution from the peppers. The method permits extraction of the capsaicinoids, while maintaining the peppers' natural flavor, texture, and color.

18 Claims, No Drawings

METHOD FOR REMOVAL OF CAPSAICINOIDS FROM PEPPERS

This application is a continuation-in-part of U.S. patent application Ser. No. 08/421,395, filed Apr. 13, 1995 now U.S. Pat. No. 5,676,991.

The present invention relates to a method for removing capsaicinoids from peppers using an aqueous solution. More specifically, the present invention uses water for the removal of the capsaicinoids from the fruit of the pepper and therefore the pepper's hotness, while retaining the pepper's natural color, texture, and flavor.

BACKGROUND OF THE INVENTION

Capsicinoids are chemical compounds that produce a heat sensation when the pepper is eaten, and are located in the pepper's placental membrane. As a general rule, the greater the amount of capsaicinolds the higher the heat level in the pepper.

Peppers containing capsaicinoids are commonly used in salsas, dips, refried beans, and a variety of other Mexican style food products as well as other types of food products. To provide consistent hotness in these food products, the hotness of the peppers must be controlled. But, the amount of capsaicinoids in the peppers varies considerably from plant to plant and from one pepper field to another. Growing conditions, variety types, soil types, weather, and other factors influence the biochemical conditions in the cells of the peppers that cause the amount of the capsaicinolds in individual peppers to vary. As a result of the varied capsaicinoid levels, the peppers must be tested before placement into food products otherwise the food products will have inconsistent levels of hotness. Unfortunately, testing the capsaicinoid levels before entry into the food production process is time consuming, expensive, and is not entirely accurate. Additionally, each individual pepper cannot be tested, leaving the danger that a consumer could bite into a pepper that is too hot. While food makers have programs and systems for monitoring the peppers to ensure uniform capsaicinoid levels, it is impossible to ensure that each pepper will contain the same amount of the capsaicinoids. Consequently, despite efforts to monitor the consistency of the peppers before they enter the production process, problems with inconsistent food products still result because of a lack of uniform capsaicinoid levels in the peppers. Thus, the known methods of ensuring uniform capsaicinoids levels are inadequate. By way of example, a mild salsa may contain peppers that were not correctly identified causing the mild salsa to be hotter than expected.

Previous methods for controlling hotness in the peppers, as mentioned, have included identifying and separating the peppers according to their capsaicinoid levels. Other previous methods have used compounds such as alcohol derivatives to solubilize and reduce the capsaicinoids. Still other previous methods have included genetically manipulating the pepper plants to control the capsaicinold levels naturally. These methods, however, are ineffective as alcohol derivatives can be harmful to humans and they strip the peppers of water resulting in the peppers losing their taste. Further, genetically manipulating the plants is not always effective as uniform results are difficult to obtain. Thus, the prior methods suffer from a number of problems including expense, accuracy, and harmfulness to humans.

SUMMARY OF THE INVENTION

In accordance with the present invention, the capsaicinoids from a variety of different types of peppers are removed from such peppers. Using the present method all or part of the capsaicinoids are effectively removed to negligible or predetermined levels, while allowing the peppers to maintain their natural color, texture, and flavor.

Preferably, the capsaicinoids are reduced to negligible levels as reduction to negligible levels is less expensive and time consuming. Reducing the capsaicinoids in the peppers to predetermined levels is more expensive as the capsaicinoid levels must be measured before treatment, thus involving more steps and more cost. Therefore, it is preferred to reduce the capsaicinoids to negligible levels, but it is recognized that the present method may be used to remove a specific amount of the capsaicinoids instead of reducing the capsaicinoids to negligible levels.

By reducing the capsaicinoids in the peppers to negligible levels, consumers will be unable to detect differences in food products containing the peppers. Thus, uniform hotness in the food product is ensured. Further, once the capsaicinoids are extracted they can be added back to the food product at a later time, as desired, to raise the heat levels in a controlled manner within the food product. The final result is a more uniform product having heat levels that remain consistent, thereby ensuring consistent taste and hotness throughout the product.

The present method is advantageous as it uses an aqueous solution, preferably water, to remove the capsaicinoids from the pepper's placental membrane. The use of an aqueous solution is desirable in the present method as the aqueous solution allows for the removal of the capsaicinoids, while leaving the natural qualities of flavor, texture, and color in the pepper or peppers. The aqueous solution is also used because it does not strip the pepper of any natural characteristics and does not damage the pepper's cell structure. It is important that not only are the capsaicinoids removed, but that the natural qualities of the pepper remain. By leaving the natural qualities, the consumer receives a pepper that appears to be completely natural, but the pepper is no longer hot. Furthermore, once the pepper has been treated the capsaicinoids may be removed from the aqueous solution or water.

According to the preferred method, the peppers are cut, so as to expose the pepper's placental membrane, with the size dependent, in part, upon how the peppers are to be used in the food product. Once the peppers have been cut, they are placed in an aqueous solution, preferably hot water, for a suitable period of time. While in the aqueous solution the peppers are agitated. The length of time the peppers are in the aqueous solution is dependent upon how much of the capsaicinoids are to be removed from the peppers. Removal of the capsaicinoids is, also, dependent upon the temperature of the aqueous solution and the intensity of the agitation. After removal from the aqueous solution, the peppers can then be placed in any food product that previously could have contained the peppers before treatment by the present method. Thus, the treatment results in a group of peppers having relatively uniform heat levels while maintaining their natural flavor, texture, and color.

DESCRIPTION OF THE PREFERRED EMBODIMENTS

In accordance with the present invention a method is provided for removing capsaicinoids from a pepper or peppers while allowing the peppers to maintain desirable natural qualities pertaining to texture, color, and taste. The preferred method, but not the only method, for removing the capsaicinolds, is to cut the peppers; place the cut peppers into an aqueous solution, preferably heated water; agitate the pepper aqueous solution mixture; and remove the peppers from the aqueous solution. No further steps are necessary to ready the peppers for use in commercial food products.

The peppers are initially cut to expose and rupture the placental membrane or membranes located inside each of the peppers. The placental membrane is in the interior portion of the peppers and is not exposed to the outside environment. Therefore, cutting the peppers serves two purposes. First, by cutting the peppers, the individual placental membranes are exposed to the aqueous solution or water. Second, the rupturing of each of the placental membranes facilitates easier removal of the capsaicinoids by allowing the aqueous solution to contact and remove the capsaicinoids. Thus, the peppers' placental membrane must be treated in some way to expose the aqueous solution to the placental membrane and to allow the aqueous solution to contact the capsaicinoids. The pepper or peppers may be cut into a variety of sizes ranging from minced to pieces a quarter inch square, or larger. Furthermore, it is permissible to cut the peppers into longitudinal sections. But, the more thoroughly the peppers are cut the easier it is to remove the capsaicinoids. This is because the placental membrane in each of the peppers is more thoroughly ruptured thereby allowing a greater amount of the capsaicinoids to exit the placental membrane. Thus, it is preferable to mince the peppers or cut the peppers into small pieces. Of course the peppers may be cut to any size to satisfy a desired end use.

A number of means may be used to cut the peppers, including a knife, a Urschell dicer, or any other type of equipment capable of cutting the peppers. The type of equipment used for cutting the peppers will be dependent upon the size of the food processing operation and the end use of the peppers.

Typically, the cut peppers may be any type of pepper containing the capsaicinoids. The following group is illustrative of, but not limited to, the peppers that may be used in the present method, included are: cayenne peppers, jalapeno peppers, serrano peppers, poblano peppers, green chili peppers, yellow hot peppers, habenero peppers, and any other type of pepper so long as such peppers contain the capsaicinolds. The present method is particularly advantageous as it can be used on jalapeno peppers, which are frequently used in commercial food products.

Once the peppers have been cut they are placed into an aqueous solution, preferably heated water. The peppers may be placed into the heated aqueous solution chilled or at room temperature, however, it is preferred to place the peppers into the heated aqueous solution when they are at room temperature as this has been found to lessen the extraction time of the capsaicinolds. Chilled peppers significantly lower the temperature of the heated aqueous solution causing a longer period of time for removal of the capsaicinolds.

The temperature of the aqueous solution, and preferably the heated water, may be from about 130° F. to about 212° F.; however, it is preferable to have the temperature of the aqueous solution equal to about 212° F. Generally, the temperature of the aqueous solution must not be too low or the removal of the capsaicinoids will take too long. Also, higher aqueous solution temperatures, near 212° F., are preferred as it has been found that capsaicinoids are slightly more soluble in hot water. It should be noted that the temperature of the aqueous solution will be in part controlled by the atmospheric pressure as the lesser the pressure the lower the boiling point. But, the aqueous solution may be at any temperature as long as the capsaicinolds are adequately removed and the pepper' natural characteristics are not damaged.

The capsaicinoids may be comprised of some or all of seven specific compounds, which are capsaicin, dihydrocapsaicin, nordihydrocapsaicin, homocapsaicin, homodihydrocapsaicin, norcapsaicin, and nornorcapsaicin. Capsaicin and dihydrocapsaicin are the two primary compounds found in the capsaicinoids and are primarily responsible for the heat sensation a consumer gets when eating an untreated pepper. Because capsaicin and dihydrocapsaicin are primarily responsible for the heat in the peppers the present method is primarily concerned with removing the two compounds. The reason that the capsaicin and the dihydrocapsaicin are responsible for the heat is that they are present in the peppers in the greatest amounts and chemically generate the highest amount of heat, as compared to the other capsaicinoids. All the compounds comprising the capsaicinoids can be removed by the present method.

A variety of aqueous solutions may be used to remove the capsaicinoids, with the preferable aqueous solution used being heated water. Furthermore, any source of water may be used, as long as the water does not contain contaminants that might contaminate the peppers or the capsaicinolds. Under the proper conditions the water will result in at least a 40% reduction in the capsaicinoid content of the pepper. The use of water is desirable because it is easy to dispose of, inexpensive to use, and is readily installed into existing production plants.

As mentioned, the preferred aqueous solution in the present process is water, however, other aqueous solutions may be used such as a water detergent solution. Detergents are desirable because they enhance the solvent characteristics of water when used in the extraction of capsaicinoids from a pepper. The detergents solubilize the capsaicinoids, which are fat like molecules. Thus, a greater amount of the capsaicinoids are removed by a water detergent solution because the detergent solubilizes the capsaicinoids. Classes of compounds that can be used in an aqueous solution include caustic agents, such as sodium hydroxide, as well as other surfactants.

In addition to the aqueous solutions described above, steam may be used to remove the capsaicinoids by, for example, blowing pressurized steam onto the cut peppers. Preferably, the peppers are either mechanically agitated while treated by the steam, or are agitated by the force of the steam itself. The steam itself can comprise surfactants or caustic agents. Using steam facilitates large scale processing of peppers and reduces aqueous solution removal and drying time.

The placement time of the peppers in the aqueous solution is also important. The peppers are placed in the aqueous solution for a predetermined amount of time, in part, dependent upon the temperature of the aqueous solution. The higher the temperature of the aqueous solution the lesser the time required to remove the capsaicinolds. Generally, the placement time can be between about 30 seconds and about 30 minutes, however, the preferred time is between about 3 minutes and about 10 minutes. The time period is also dependent in part on the level of desired removal. To reduce the capsaicinold amount in the peppers to negligible levels more time is required, whereas less time is required, if treated at the same temperature, to reduce the capsaicinoids to a predetermined level. Of course, if the capsaicinoid levels are to be reduced to a predetermined level, the amount of the capsaicinoids present in the peppers must be approximately known before treatment. Thus, the method can be used to reduce the capsaicinoids to specific or negligible levels. Further, if the amount of the capsaicinoids is known before treatment, then the amount of removal can be predicted based on the temperature of the aqueous solution and the time of the peppers in the aqueous solution. Regardless of the time period, the peppers should be placed in the aqueous solution for a sufficient amount of time to allow suitable extraction without damaging the peppers or causing excessive cell damage.

Additionally, the pepper aqueous solution mixture should be agitated to facilitate the removal of the capsaicinoids from the peppers. Agitation is important to prevent the aqueous solution from binding to a limited amount of the capsaicinoids. Through agitation more of the aqueous solution is exposed to the capsaicinoids, and more exposure between the solution and the capsaicinoids causes greater removal. Agitation can include mixing, sonicating, shaking, tumbling, combinations thereof, or any other method capable of suitably circulating the aqueous solution among the peppers. Whatever the method of agitation, the aqueous solution should be in continuous movement. As a cautionary note, the peppers should not be agitated too rigorously as the cells of the peppers may be damaged. Preferably, a mixer is used at a mixing speed having a tip velocity of from about 30 feet/minute to about 270 feet/minute, with the most preferred mixing speed being a tip velocity of approximately 190 feet/minute.

Generally, the capsaicinolds are removed from the peppers in an amount greater than 40% of the total capsaicinolds in the peppers when the peppers are agitated by constant stirring, in heated water having a temperature of approximately 212° F., for approximately 10 minutes. These are the preferable conditions for adequate removal of the capsaicinolds, while minimizing the loss of the the natural qualities of the peppers.

Once the peppers have been removed from the heated aqueous solution, especially an aqueous solution containing a detergent, they may be rinsed to remove the aqueous solution containing the capsaicinoids from the peppers. Any method of rinsing may be used as long as the aqueous solution/capsaicinoid mixture is adequately removed from the peppers. Thus, the peppers may be rinsed by air, water, or any other suitable method. Warm water is preferred as the cell structure of the peppers is not damaged, however, the water may be at any temperature as long as it effectively removes the aqueous solution containing the capsaicinoids and does not damage the peppers. Also, an air rinse may be used whereby the peppers are exposed to an air blast that adequately removes the aqueous solution. The peppers may be rinsed for any suitable amount of time so long as the aqueous solution is adequately removed from the surface of the peppers.

Once the aqueous extraction solution on the peppers has been removed, by, for example, drying the solution off, the peppers may be used in a variety of food products. Furthermore, the aqueous solution may be processed to extract the capsaicinoids. Removal of the capsaicinoids from the aqueous solution may be accomplished in a number of ways including using a conventional phase separation technique or an oil in water emulsion separation, as well as any of a variety of known methods that will acceptably remove the capsaicinoids from the aqueous solution. The phase separation technique is desirable because the capsaicinoids are hydrophobic, thus the capsaicinoids can be readily separated from the aqueous solution or water. The phase separation technique will typically be used when the aqueous solution used to extract the capsaicinoids is water.

Instead of removing the capsaicinoids from the aqueous solution, the aqueous solution containing the capsaicinoids may be used to flavor a variety of food products by cooking the food products in the aqueous solution. It should be noted that if the aqueous solution contains a detergent, the detergent should be removed from the aqueous solution. By cooking a food product in the aqueous solution containing the capsaicinoids, the heat from the capsaicinoids is transferred to the food product, thereby increasing the heat level in the food product. The capsaicinoids can be readily dispersed or emulsified throughout the continuos aqueous phase. The emulsion can preferably be stabilized by using conventional emulsion stabilizers to from a relatively uniform emulsion of capsaicinoids in the aqueous solution. Furthermore, these methods can be used in combination with the removal of some of the capsaicinoids from the aqueous solution. After the aqueous solution has been filtered, a significant mount of the capsaicinoids may still remain in the aqueous solution allowing the aqueous solution to be used to flavor food products. Thus, both treated and untreated aqueous solutions may be used to flavor food products.

In order to further illustrate the present invention the following examples are given. However, it is to be understood that the examples are for illustrative purposes only and are not to be construed as limiting the scope of the subject invention.

EXAMPLES

Example 1

Approximately 400 grams of jalapeno peppers were obtained and rinsed so as to remove any debris, such as dirt, and any chemicals, such as herbicides and/or pesticides. The individual jalapeno peppers were then topped or de-stemmed. After de-stemming, the jalapeno peppers were then hand diced into quarter inch sections so that they were approximately a ¼ of an inch by a ¼ of an inch in size. The peppers were then divided into two groups, the first group was to be untreated and contained 200 grams of peppers, and the second group was to be treated and contained 200 grams of peppers.

After the peppers were divided, 800 grams of water was placed in a standard metal cooking pan on a gas burner and heated to a temperature of 212° F. The water temperature was monitored, and once the water reached 212° F., 200 grams of the diced jalapeno peppers were then added to the boiling water. The jalapeno peppers were left in the boiling water for 10 minutes. The jalapeno peppers were constantly hand stirred using a standard stirring stick to simulate agitation. After the passage of ten minutes in the boiling water the jalapeno peppers were removed and then drained and dried to remove any excess water from the peppers.

Next the two groups of peppers were examined to determine the amount of capsaicinoids, primarily capsaicin and dihydrocapsaicin, present in the peppers. The amount of capsaicinoids were determined using a standard technique, with the method starting with the two groups of peppers, the untreated group and the treated group. Each group contained approximately 200 grams of peppers. Each group was accurately weighed and separately ground in a blender into a puree sample. Each ground pepper sample was mixed with 100 ml of 95% ethanol and a sufficient amount of water to form a 200 ml suspension. The two pepper suspensions were then refluxed for 5 hours. After refluxing, the suspensions were allowed to cool and then they were diluted to a total volume of 200 ml with 95% ethanol. Each sample was then analyzed by injecting a 5 microliter sample into an HPLC column packed with reverse phase Nova-pak C-18, with the column having a flow rate of 1.1 ml/min and a mobile phase ratio of 46:54. Furthermore, the chromatographic test was isocratic. The HPLC column was monitored by a Coulochem II electrochemical detector. Data from the Coulochem II detector was collected, the data being given in peaks, and standardized by a computer to determine the amount of the capsaicinolds in parts per million (ppm) remaining in the peppers. The data was interpreted by measuring the area under the peaks. The following equation was used to determine the amount of the capsaicinoids:

((sample peak response/standard peak response)×(standard concentration (ppm)×(dilution/sample weight))=ppm of the capsaicinoids in the sample.

As mentioned above the Coulochem II detector gave a reading in peaks, with the peaks being used in the previous equation.

It was determined that the amount of the capsaicinolds in the untreated sample was equal to 77.8 parts per million by weight and the mount of the capsaicinoids in the treated peppers was equal to 46.8 parts per million by weight. Thus, the use of water in the present method resulted in a 40% reduction of the capsaicinolds in the treated peppers, wherein the capsaicinoids were reduced from 77.8 ppm to 46.8 ppm.

EXAMPLE 2

Approximately 400 grams of jalapeno peppers were obtained and rinsed so as to remove any debris, such as dirt, and any chemicals, such as herbicides and/or pesticides. The individual jalapeno peppers were then topped or de-stemmed. After the jalapeno peppers were topped they were hand diced into quarter inch section so that they were a ¼ of an inch by a ¼ of an inch in size. After the dicing the jalapeno peppers were segregated into four groups containing 100 grams of peppers each.

The first group of peppers was a control group, used to test the amount of capsaicinoids in the untreated peppers. In the control group 100 grams of peppers were treated according to the method of Example 1, wherein the amount of the capsaicinoids in the peppers prior to treatment was determined. The untreated peppers had an amount of capsaicinoids equal to 34.4 part per million by weight.

The second group of peppers contained 100 grams of peppers and was tested in a solution containing water and Dawn brand commercial dish washing detergent (® to Proctor & Gamble, Cincinnati, Ohio). 700 grams of water was added to a stainless steel pot on top of a gas fired stove. The water was heated to 140° F., once the water reached 140° F., 7 grams of Dawn brand dish washing detergent (® to Proctor & Gamble, Cincinnati, Ohio) was added thereto. After the addition of the detergent, 100 grams of the diced jalapeno peppers were added to the water containing the Dawn brand dish washing detergent (® to Proctor & Gamble, Cincinnati, Ohio). The peppers were stirred constantly while in the water detergent solution and the temperature was maintained between about 130° F. and about 140° F. After the passage of 10 minutes the peppers were removed from the water detergent solution and the peppers were then rinsed for three minutes with hot tap water. The peppers were then examined according to the process detailed in Example 1. It was found that the peppers treated in the water and Dawn brand dish washing detergent (® to Proctor & Gamble, Cincinnati, Ohio) solution had amount of capsaicinoids after treatment equal to 9.5 pans per million by weight.

The third group of jalapeno peppers was placed in 700 grams of hot water located in a stainless steel pot on top of a gas fired stove. The water in the stainless steel pot was heated to 140° F. Once the water reached 140° F., 100 grams of the jalapeno peppers were added to the water and hand stirred constantly for 10 minutes. The temperature of the water was maintained between about 130° F. and about 140° F. After placement in the water for 10 minutes, the diced jalapeno peppers were then removed and dried so as to remove the water from the peppers. The peppers were then tested according to the process detailed in Example 1. It was found that the amount of capsaicinoids remaining in the peppers after treatment in the hot water was equal to approximately 15 parts per million by weight.

The final group of jalapeno peppers was tested in a solution of water and a caustic agent. Again, 700 grams of water was added to a stainless steel pot and placed on top of a gas fired stove with the water then heated to 140° F. After the water reached a temperature of 140° F., 3.5 grams of 40% sodium hydroxide was added to the water and mixed in. The addition of the sodium hydroxide was followed by the addition of 100 grams of diced jalapeno peppers. The water temperature was maintained between about 130° F. and about 140° F. The peppers, were hand stirred in the solution for 10 minutes. After stirring for 10 minutes, the peppers were removed from the water sodium hydroxide solution and rinsed with hot tap water for three minutes. The peppers were then examined according to the process derailed in Example 1 to determine the amount of capsaicinolds remaining in the treated peppers. The remaining capsaicinolds in the treated peppers were equal to 9.4 parts per million by weight. Thus, as can be seen the water and detergent solutions more effectively remove the capsaicinolds from the peppers than the water by itself. However, all three treatments resulted in the reduction in the amount of capsaicinolds in the peppers.

Thus there has been shown and described a novel method for removing capsaicinolds from peppers which fulfills all of the objects and advantages sought therefor. It will be apparent to those skilled in the art, however, that many changes, variations, modifications, and other uses and applications for the subject method are possible, and also such changes, variations, modifications, and other uses and applications which do not depart from the spirit and scope of the invention are deemed to be covered by the invention which is limited only by the claims which follow.

What is claimed:

1. A method for removing capsaicinoids from a pepper having a placental membrane which comprises the steps of:
   cutting the pepper to expose the pepper's placental membrane; and exposing the placental membrane of the cut pepper to an aqueous solution selected from the group consisting of water and a water-detergent solution heated to a temperature ranging from between about 130° F. and about 212° F. for a period of time sufficient to allow the aqueous solution to remove at least some of the capsaicinoids from the placental membrane of the cut pepper, wherein the cut pepper's cell structure remains substantially unchanged after exposure of the placental membrane to the aqueous solution.

2. The method of claim 1 wherein the pepper is placed in the aqueous solution for a time period ranging from about 30 seconds to about 30 minutes.

3. The method of claim 1 wherein the preferred temperature is about 212° F.

4. The method of claim 2 wherein the preferred time is from about 3 to about 10 minutes.

5. The method of claim 1 wherein the pepper is cut into sizes ranging from minced to longitudinal slices.

6. The method of claim 1 wherein the pepper in the aqueous solution is agitated.

7. The method of claim 6 wherein the pepper may be rinsed after treatment in the aqueous solution by either a water rinse, an air rinse, or a combination thereof.

8. The method of claim 6 wherein the pepper in the heated aqueous solution is agitated by a mixer having a tip velocity of between about 30 feet/minute and about 270 feet/minute.

9. The method of claim 8 wherein the mixing speed tip velocity is approximately 190 feet/minute.

10. A method for removing capsaicinoids from a pepper, wherein the pepper's natural characteristics of color, texture, and flavor remain largely intact after treatment with method, comprising the steps of:

(a) cutting the pepper so as to expose the interior of the pepper;

(b) placing the cut pepper into a desired amount of an aqueous solution selected from the group consisting of water and a water-detergent solution wherein the aqueous solution is heated to a temperature ranging from about 130° F. to about 212° F. to facilitate a transfer of the capsaicinolds from the pepper to the aqueous solution;

(c) agitating the pepper in the aqueous solution;

(d) removing the pepper from the aqueous solution after a period of time sufficient to remove a desired amount of the capsaicinoids present in the pepper; and (e) rinsing the pepper.

11. The method of claim 10 wherein the pepper may be a single pepper or a plurality of peppers.

12. The method of claim 10 wherein the pepper may be selected from any group of peppers containing the capsaicinoids.

13. The method of claim 10 wherein the pepper is placed in the aqueous solution for a time period between about 30 seconds to about 30 minutes.

14. The method of claim 10 wherein the preferred temperature is about 212° F.

15. The method of claim 13 wherein the preferred time period is from about 3 to about 10 minutes.

16. The method of claim 10 wherein the pepper is cut into sizes ranging from minced to longitudinal slices.

17. The method of claim 10 wherein the pepper in the aqueous solution is agitated by mixing at a mixing speed tip velocity of between about 30 feet/minute and about 270 feet/minute.

18. The method of claim 17, wherein the preferred mixing speed tip velocity is approximately 190 feet/minute.

\* \* \* \* \*

UNITED STATES PATENT AND TRADEMARK OFFICE
CERTIFICATE OF CORRECTION

PATENT NO.: 5,714,192

DATED: February 3, 1998

INVENTOR(S): Bob J. Dull, David J. Domingues, Thomas E. Heinzen

It is certified that errors appear in the above-identified patent and that said Letters Patent is hereby corrected as shown below:

Column 1, line 18, "capsaicinolds" should be -- capsaicinoids--.

Column 1, line 29, "capsaicinolds" should be -- capsaicinoids--.

Column 1, line 56, "capsaicinold" should be -- capsaicinoid--.

Column 2, line 67, "capsaicinolds" should be -- capsaicinoids--.

Column 3, line 52, "capsaicinolds" should be -- capsaicinoids--.

Column 3, line 54, "capsaicinolds" should be -- capsaicinoids--.

UNITED STATES PATENT AND TRADEMARK OFFICE
CERTIFICATE OF CORRECTION

PATENT NO.: 5,714,192

DATED: February 3, 1998

INVENTOR(S): Bob J. Dull, David J. Domingues, Thomas E. Heinzen

It is certified that errors appear in the above-identified patent and that said Letters Patent is hereby corrected as shown below:

Column 3, line 66, "capsaicinolds" should be -- capsaicinoids--.

Column 4, line 24, "capsaicinolds" should be -- capsaicinoids--.

Column 4, line 56, "capsaicinolds" should be -- capsaicinoids--.

Column 4, line 61, "capsainolds" should be -- capsaicinoid--.

Column 5, line 28, " capsaicinold" should be -- capsaicinoid --.

Column 5, line 29, "capsaicinolds" should be -- capsaicinoids--.

UNITED STATES PATENT AND TRADEMARK OFFICE
CERTIFICATE OF CORRECTION

PATENT NO.: 5,714,192

DATED: February 3, 1998

INVENTOR(S): Bob J. Dull, David J. Domingues, Thomas E. Heinzen

It is certified that errors appear in the above-identified patent and that said Letters Patent is hereby corrected as shown below:

Column 5, line 33, "capsaicinolds" should be -- capsaicinoids--.

Column 7, line 10, "capsaicinolds" should be -- capsaicinoids--.

Column 7, line 21, "capsaicinolds" should be -- capsaicinoids--.

Column 7, line 23, "mount" should be -- amount--.

Column 7, line 26, "capsaicinolds" should be -- capsaicinoids--.

Column 8, line 2, "pans" should be -- parts--.

UNITED STATES PATENT AND TRADEMARK OFFICE
CERTIFICATE OF CORRECTION

PATENT NO.: 5,714,192

DATED: February 3, 1998

INVENTOR(S): Bob J. Dull, David J. Domingues, Thomas E. Heinzen

It is certified that errors appear in the above-identified patent and that said Letters Patent is hereby corrected as shown below:

Column 8, line 30, "derailed" should be -- detailed--.

Column 8, line 31, "capsaicinolds" should be -- capsaicinoids--.

Column 8, line 32, "capsaicinolds" should be -- capsaicinoids--.

Column 8, line 38, "capsaicinolds" should be -- capsaicinoids--.

Column 8, line 40, "capsaicinolds" should be -- capsaicinoids--.

Column 9, line 7, "claim 6" should be -- claim 1--.

Column 9, line 26, "capsaicinolds" should be -- capsaicinoids--.

Signed and Sealed this

Twenty-eighth Day of April, 1998

Attest:

BRUCE LEHMAN

*Attesting Officer*    *Commissioner of Patents and Trademarks*